Sept. 23, 1941.  G. W. HEBBLEWHITE  2,257,053
AIRCRAFT HANGAR CONSTRUCTION
Filed April 7, 1939  3 Sheets-Sheet 1

INVENTOR.
Gilbert W. Hebblewhite
BY
ATTORNEY.

Sept. 23, 1941.   G. W. HEBBLEWHITE   2,257,053
AIRCRAFT HANGAR CONSTRUCTION
Filed April 7, 1939   3 Sheets-Sheet 2

INVENTOR.
Gilbert W. Hebblewhite
BY
ATTORNEY.

Sept. 23, 1941.　　G. W. HEBBLEWHITE　　2,257,053
AIRCRAFT HANGAR CONSTRUCTION
Filed April 7, 1939　　3 Sheets-Sheet 3

INVENTOR.
Gilbert W. Hebblewhite
BY
ATTORNEY.

Patented Sept. 23, 1941

2,257,053

UNITED STATES PATENT OFFICE 2,257,053

AIRCRAFT HANGAR CONSTRUCTION

Gilbert W. Hebblewhite, Lansing, Mich., assignor to E. Clement Jarvis, doing business as Jarvis Engineering Works Application April 7, 1939, Serial No. 266,503

10 Claims. (Cl. 189—1.5)

This invention relates in general to building constructions and particularly to a circular aircraft hangar.

Circular type aircraft hangars present many advantages over those of angular design because of a greater usable area, the possibility of a design wherein the side walls may consist entirely of doors making more flying units accessible for immediate use, greater strength and much less resistance to wind pressure, and, if desired, the employment of partitions to provide individual or group compartments with adequate door openings for each. While these general advantages have been well understood, previous attempts to create an efficient design have failed various reasons or have been so costly to fabricate and erect as to be impractical.

Accordingly, it is an object of the present invention to provide a circular aircraft hangar which is efficient and sturdy in design and yet is so constructed as to be economically practical for general use.

It is another object of the invention to provide an aircraft hangar which may be disassembled, transported and again erected with a minimum amount of effort and expense.

A further object resides in the provision of a portable, sectional roof structure for a circular building which may be easily and quickly removed, transported and reassembled.

Other objects and advantages of the invention will become apparent from a reading of the following description taken in connection with the accompanying drawings in which.

Figure 5:
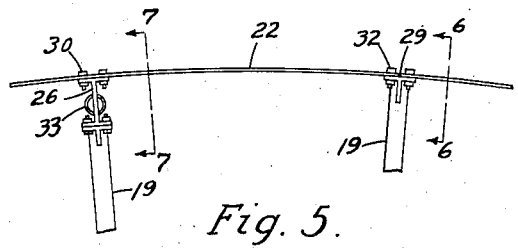
Fig. 5 is a fragmentary horizontal view showing the circular girder, a peripheral vertical support therefor and connecting radial trusses.
Figure 7:
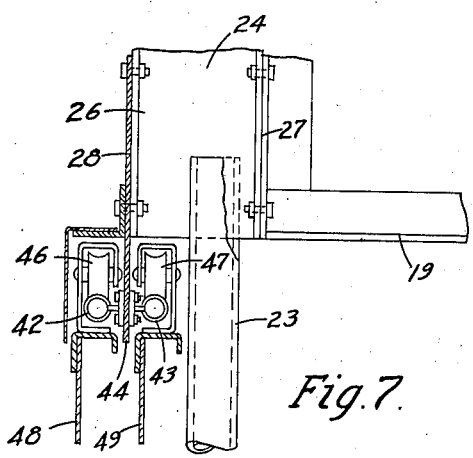
Fig. 7 is a similar fragmentary sectional view taken substantially on the line 7—7 of Fig. 5.
Figure 6:
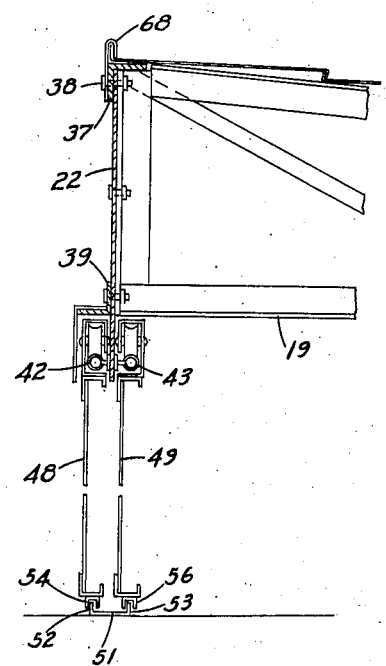
Fig. 6 is a vertical sectional view of the structure taken substantially along the line 6—6 of Fig. 5.
Figure 8:
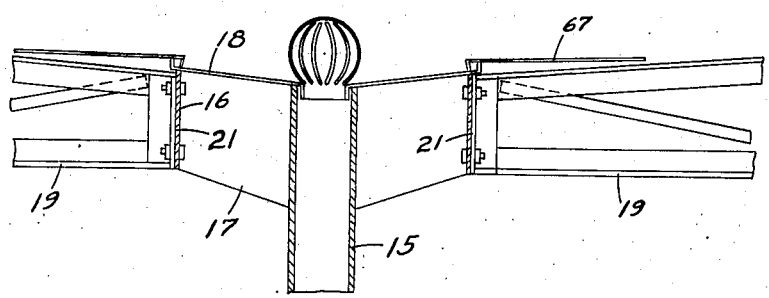
Fig. 8 is an enlarged view showing the central supporting column and connecting radial trusses.

Referring to the drawings, reference numeral 15 indicates a central vertical ground support which may be of hollow, round cross-section and which carries at its upper end a spaced, circular ring 16 which turn is supported on the column 15 in spaced relation thereto by diagonal bracing 17 and may be provided with a cover 18 inclined toward the column 15 affording a water drain to the interior thereof which in turn may connect with a drain pipe 20 in the ground. A plurality of suitably spaced truss members 19 may be secured to the ring 16 as at 21 and extend radially therefrom to the outer periphery of the building where they are connected to a circular supporting girder 22. The radial truss members 19 and the central ring 16 are constructed and arranged to define a downwardly dished roof structure. The circular girder 22 is in turn supported outwardly of and upon vertical columns 23 spaced in a circular path about the central column 15 and, as shown in Figs. 5 and 7, preferably of round cross-section and slotted adjacent their upper ends to receive the webs 24 of relatively short H members 26. Each of the web portions 24 is positioned in its column on a radial line from the central support 15, presenting a flanged face 27 toward the center of the structure and a flanged face 28 toward the periphery thereof to which are secured respectively the outer ends of some of the radial trusses 19 and the flat inner faces of the circular plate girder 22 as at 30. The remaining radial trusses 19 which are not in line with the peripheral supporting columns may be secured directly to the plates 22 of the circular girder, the individual sections of which may lie in abutting relation as at 29 and secured as at 32 forming a cantilever support for these intermediate radial trusses. The entire truss structure may be strengthened by suitable diagonal bracing 33, 34 and 36.

The circular girder plates 22 may be strengthened and stiffened by a circularly formed angle 37 lying over the upper edge thereof and secured thereto as at 38 and a similar, oppositely extending angle 39 near the lower edge thereof which is positioned upon the outside of the circular plates 22. Circular door tracks 42 and 43 are positioned upon opposite sides of a depending portion 44 of the girder plate 22 to receive the rollers 46 and 47 of doors 48 and 49 which encircle the building and form the side wall closures. For buildings of a permanent type, a guide channel 51 may be imbedded or otherwise secured to the ground and provided with upturned flanges 52 and 53 engaging channels 54 and 56 secured to the bottoms of the doors. For a portable installation, the above guide channel may be dispensed with and hooks and eyes 57 or other suitable retaining means may be employed to prevent the doors from swinging on their hangers.

Figure 9:
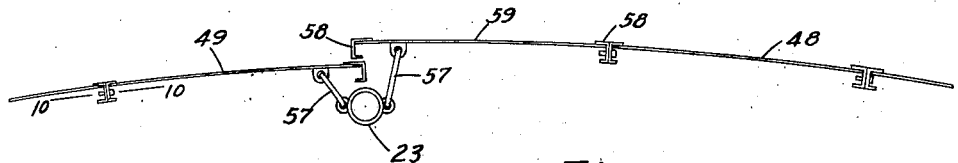
Fig. 9 is a horizontal sectional view taken through a group of doors.
Figure 10:
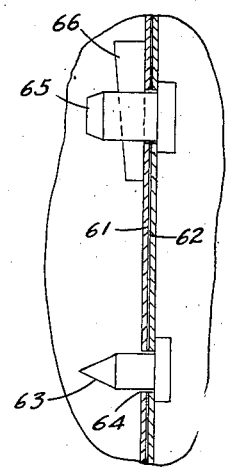
Fig. 10 is a fragmentary vertical sectional view taken on the line 10—10 of Fig. 9.

With reference to Figs. 9 and 10, the individual doors 48 and 49 may be formed with channel frames 58 and an attached arcuately curved plate 59 conforming to the general circumferential curve of the building, the abutting edges 61 and 62 of the door frames being provided with corresponding openings 64 to receive guide pins 63 so that the doors may be rolled in convenient groups. In the case of a construction designed for permanency, the door frames may also be provided with slotted pins and locking keys 65 and 66.

Figure 3:
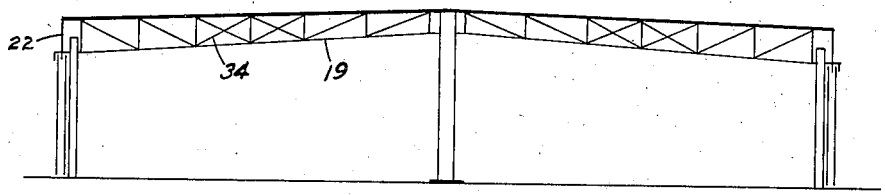
Fig. 3 is a view similar to that of Fig. 2 but showing a slightly modified form of the building.
Figure 11:
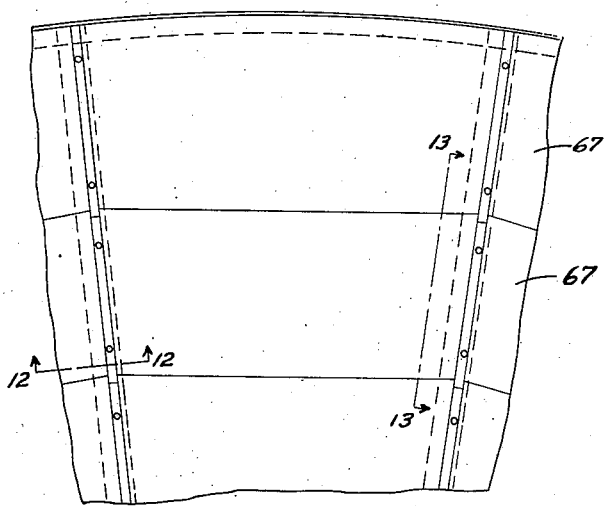
Fig. 11 is a fragmentary plan view of a portion of the portable roof construction.
Figure 12:
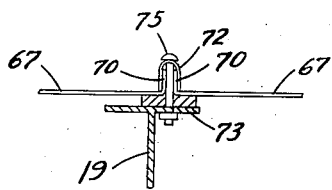
Fig. 12 is a sectional view taken on the line 12—12 of Fig. 11.
Figure 13:
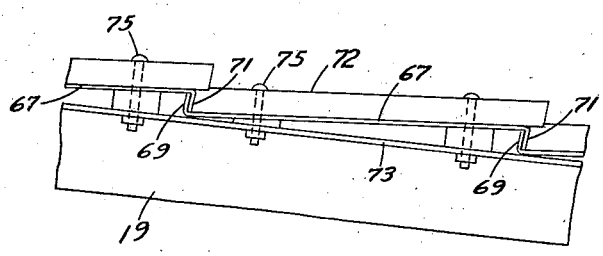
Fig. 13 is a sectional view taken on the line 13—13 of Fig. 11.

For permanent structures, a steel deck or other roof covering of well known construction may be employed but hangars of this type designed for portability or semi-permanence, it is highly desirable that the roof be capable of easy assembly and disassembly as well as convenient to handle and transport. To this end the roof shown in Figs. 2, 6, 7 and 8 is designed to slope from the outer periphery of the building toward the central column 15 forming a water drain through the central column, eliminating expensive gutters and downspouts. The details are shown in Figs. 11, 12 and 13 wherein reference numeral 67 indicates a plurality of separable metal units preferably of general trapezoidal shape gradually decreasing in size from the larger sections adjacent the periphery of the structure toward the central column 15 forming portions of a segment which in turn may be assembled in the form of a circle. For a circular building of the type shown, the outer edges of the peripheral sections may be arcuately curved to conform to the circumferential curve of the building and secured to the top angle 37 of the circular girder 22 by a finishing ring 68. Each roof unit 67 is provided with an angularly bent, upturned flange 69 extending along the outer edge thereof, upturned flanges 70 along either side, and a downturned flange 71 adapted to cooperate with the outward upturned angular flange of the succeeding smaller unit to form a weather-tight joint. In assembling the units, the abutting side flanges 70 of adjacent units may be secured by a strip of metal 72 bent to form a cap and bolted through spacer blocks as at 75 to a top flange 73 of a radial truss 19. The cap 72 of each unit extends inwardly sufficiently to engage the cap of the succeeding unit forming a water-tight seal at this point. For outwardly sloping roofs as shown in Fig. 3, it is only necessary to reverse the relation of the flanges 69 and 71 to reverse the slope.

To disassemble this roof it is only necessary to separate a few groups of units 67 sufficiently to be easily removed, and it is a simple matter to transport and again reassemble the parts without damage.

It will thus be apparent that a circular hangar of exceptionally simple, sturdy and economical construction is herein provided, and one which may be permanent, or only temporary, if desired, with a minimum amount of labor involved in disassembling and transporting the parts for assembly at another location. For wartime use or in instances where the building is intended to be only temporary, the metal roof units 67 and the circular door plates may be dispensed with and replaced by canvas or other temporary covering, thus decreasing the original cost and increasing the portability of the structure as a whole.

Figure 1:
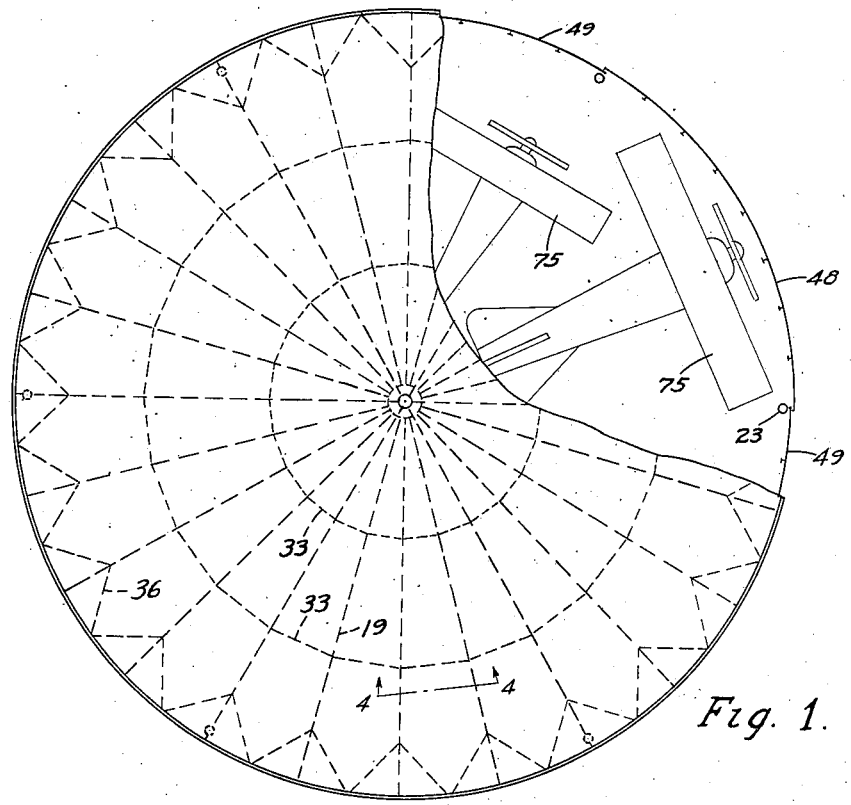
Fig. 1 is a top plan view of an aircraft hangar embodying the features of the present invention, a portion being broken away to show a partial floor plan.
Figure 2:
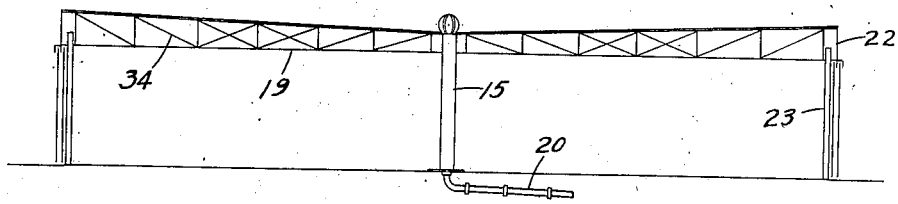
Fig. 2 is a diagrammatical vertical sectional view showing one form the hangar may assume.
Figure 4:
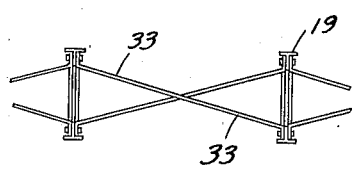
Fig. 4 is a detailed sectional view taken substantially on the line 4—4 of Fig. 1.

Due to the fact that the side walls of the building are made up entirely of doors, it will be apparent from the partial floor plan of Fig. 1 that a comparatively large number of aeroplanes 75 may be headed directly out of the building and readily accessible to be flown upon short notice, whereas in hangar designs at present in use, it is rarely possible to have more than two or three units accessible without the necessity of first removing several others.

Because of the rigidity provided by the circular girder 22, a relatively small number of vertical columns 23 are necessary and they may, if desired, be unequally spaced about the periphery of the building providing doorways of different widths, making it possible to accommodate an aeroplane having a comparatively large wingspread.

It will be obvious to those skilled in the art that various modifications in construction and design may be made without departing from the spirit or scope of the invention which is to be limited only by the appended claims.

What is claimed and desired to be secured by Letters Patent is:

1. An aircraft hangar comprising a central support, a plurality of spaced vertical columns arranged in a circle about said central support as an axis, a circular girder carried on said columns and outwardly thereof with respect to the central support, and spaced radial trusses connecting said central support and said circular girder.

2. An aircraft hangar comprising a central support, a horizontal ring member secured thereto, a plurality of spaced vertical columns arranged in a circle about said central support as an axis, a circular girder carried on said vertical columns and outwardly thereof with respect to the central support, and spaced radial trusses connecting said horizontal ring member and said circular girder.

3. An aircraft hangar comprising a central support, a horizontal ring member secured thereto, a plurality of spaced vertical columns arranged in a circle about said central support as an axis, a circular girder carried on said vertical columns and outwardly thereof with respect to the central support, and spaced radial trusses connecting said horizontal ring member and said circular girder, said horizontal ring member and said spaced radial trusses being constructed and arranged to define a downwardly dished roof structure.

4. An aircraft hangar comprising a central support, a plurality of spaced vertical columns arranged in a circle about said central support as an axis, a circular girder carried on said vertical columns and outwardly thereof with respect to the central support, spaced radial trusses connecting said central support and said circular girder, and doors carried by said circular girder.

5. An aircraft hangar comprising a central support, a plurality of spaced vertical columns arranged in a circle about said central support as an axis, a circular girder carried on said vertical columns and outwardly thereof with respect to the central support, spaced radial trusses connecting said central support and said circular girder, and slidable doors carried entirely by said circular girder.

6. In an aircraft hangar, a central vertical support, a plurality of spaced vertical columns slotted adjacent their upper ends and arranged in a circle about said central support, relatively short H members carried in the slotted portions of said vertical columns with the webs of said H members positioned on radial lines extending from said central support, radial trusses connecting the inner faces of said H members to said central support, and a circular girder connected to the opposite faces of said H members.

7. In an aircraft hangar, a central vertical support, a plurality of H members arranged in a circle about said central support and positioned with the webs thereof on radial lines extending from said central support, radial trusses connecting the inner faces of said H members to said central support, and a circular girder connected to the opposite faces of said H members.

8. In an aircraft hangar, a central vertical support, a plurality of spaced vertical columns slotted adjacent their upper ends and arranged in a circle about said central support, relatively short H members carried in the slotted portions of said vertical columns with the webs of said H members positioned on radial lines extending from said central support, radial trusses connecting the inner faces of said H members to said central support, a circular girder connected to the opposite faces of said H members, and other radial trusses extending from said central support and connected directly to said circular girder.

9. In an aircraft hangar, a central vertical support, a plurality of spaced vertical columns slotted adjacent their upper ends and arranged in a circle about said central support, relatively short H members carried in the slotted portions of said vertical columns with the webs of said H members positioned on radial lines extending from said central support, radial trusses connecting the inner faces of said H members to said central support, a circular girder connected to the opposite faces of said H members, door tracks supported adjacent the lower edge of said circular girder, and slidable doors carried by said tracks.

10. In an aircraft hangar, a central vertical support, a plurality of spaced vertical columns slotted adjacent their upper ends and arranged in a circle about said central support, relatively short H members carried in the slotted portions of said vertical columns with the webs of said H members positioned on radial lines extending from said central support, radial trusses connecting the inner faces of said H members to said central support, a circular girder connected to the opposite faces of said H members, circular door tracks supported adjacent the lower edge of said circular girder, and transversely curved slidable doors carried by said tracks.

GILBERT W. HEBBLEWHITE.